US010903007B2

(12) United States Patent
Ono et al.

(10) Patent No.: US 10,903,007 B2
(45) Date of Patent: Jan. 26, 2021

(54) MULTI-LAYER CERAMIC ELECTRONIC COMPONENT AND METHOD OF PRODUCING THE SAME

(71) Applicant: Taiyo Yuden Co., Ltd., Tokyo (JP)

(72) Inventors: Ryo Ono, Tokyo (JP); Tetsuhiko Fukuoka, Tokyo (JP); Shoji Kusumoto, Tokyo (JP); Akihiko Kono, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 2 days.

(21) Appl. No.: 16/194,971

(22) Filed: Nov. 19, 2018

(65) Prior Publication Data

US 2019/0164693 A1 May 30, 2019

(30) Foreign Application Priority Data

Nov. 30, 2017 (JP) .................................. 2017-230119

(51) Int. Cl.
*H01G 4/224* (2006.01)
*H01G 4/30* (2006.01)
*H01G 4/012* (2006.01)
*H01G 4/12* (2006.01)
(Continued)

(52) U.S. Cl.
CPC .............. *H01G 4/224* (2013.01); *H01G 4/012* (2013.01); *H01G 4/30* (2013.01); *H01G 4/1227* (2013.01); *H01G 4/1236* (2013.01); *H01G 4/1245* (2013.01); *H01G 4/232* (2013.01); *H01G 4/248* (2013.01)

(58) Field of Classification Search
CPC ............ H01G 4/005; H01G 4/06; H01G 4/08; H01G 4/012; H01G 4/12; H01G 4/30; H01G 4/232; H01G 4/248
See application file for complete search history.

(56) References Cited

U.S. PATENT DOCUMENTS

| | | | | |
|---|---|---|---|---|
| 6,069,786 A | * | 5/2000 | Horie | ...................... H01G 4/255 |
| | | | | 29/25.42 |
| 9,165,713 B2 | * | 10/2015 | Lee | ........................ H01G 4/005 |
| 9,793,051 B2 | * | 10/2017 | Ahn | ..................... H05K 3/3442 |

(Continued)

FOREIGN PATENT DOCUMENTS

JP          2016-025287 A          2/2016

*Primary Examiner* — Dion Ferguson

(74) *Attorney, Agent, or Firm* — Saliwanchik, Lloyd & Eisenschenk

(57) ABSTRACT

A multi-layer ceramic electronic component includes a ceramic body including a multi-layer unit, a side margin, and ridges. The multi-layer unit includes a capacitance forming unit including ceramic layers laminated in a first direction and internal electrodes disposed between the ceramic layers, a cover that covers the capacitance forming unit in the first direction, and a side surface facing in a second direction orthogonal to the first direction. The side margin covers the side surface. The ridges are rounded and extend in a third direction orthogonal to the first and second directions. The capacitance forming unit includes a first region disposed at a center portion in the first direction, and a second region disposed between the cover and the first region, end portions of the internal electrodes in the second direction in the second region being positioned inward in the second direction relative to those in the first region.

6 Claims, 8 Drawing Sheets

(51) Int. Cl.
*H01G 4/248* (2006.01)
*H01G 4/232* (2006.01)

(56) References Cited

U.S. PATENT DOCUMENTS

| | | | |
|---|---|---|---|
| 2011/0267736 A1* | 11/2011 | Sasabayashi | H01G 4/005 361/301.1 |
| 2011/0273815 A1* | 11/2011 | Kobayashi | H01G 4/232 361/306.3 |
| 2012/0073129 A1* | 3/2012 | Abe | H01G 4/08 29/825 |
| 2014/0307362 A1* | 10/2014 | Kim | H01G 4/30 361/301.4 |
| 2014/0311783 A1* | 10/2014 | Lee | H01G 4/12 174/260 |
| 2015/0075854 A1* | 3/2015 | You | H01G 4/30 174/260 |
| 2015/0170843 A1* | 6/2015 | Kim | H01G 4/1209 361/301.4 |
| 2015/0325377 A1* | 11/2015 | Takeuchi | H01G 4/30 361/301.4 |
| 2016/0284471 A1* | 9/2016 | Mizuno | H01G 4/30 |
| 2017/0309402 A1* | 10/2017 | Yamashita | H01F 17/0013 |
| 2019/0304697 A1* | 10/2019 | Nakamura | H01G 4/232 |
| 2020/0051744 A1* | 2/2020 | Park | H01G 4/008 |

* cited by examiner

MULTI-LAYER CERAMIC ELECTRONIC COMPONENT AND METHOD OF PRODUCING THE SAME

CROSS-REFERENCE TO RELATED APPLICATION

This application claims the benefit under 35 U.S.C. § 119 of Japanese Application No. 2017-230119 filed Nov. 30, 2017, which is hereby incorporated in its entirety.

BACKGROUND

The present disclosure relates to a multi-layer ceramic electronic component including side margins provided in a subsequent step, and to a method of producing the multi-layer ceramic electronic component.

Multi-layer ceramic capacitors are known as multi-layer ceramic electronic components. A multi-layer ceramic capacitor includes a ceramic body and external electrodes, the ceramic body including a plurality of laminated ceramic layers and internal electrodes disposed between the ceramic layers, the external electrodes being formed on the outer surface of the ceramic body and electrically connected to the internal electrodes.

In a general production process of the multi-layer ceramic capacitor, before the external electrodes are formed on the ceramic body, the ceramic body is chamfered by barrel polishing (see, for example, Japanese Patent Application Laid-open No. 2016-25287). This can inhibit the ceramic body from having chipping, cracking, or the like in ridges (where two surfaces intersect with each other) and corners (where three surfaces intersect with one another).

SUMMARY

However, in the multi-layer ceramic capacitor, the internal electrodes may be exposed in the ridges of the ceramic body by the chamfering of the ceramic body. In such a case, moisture easily infiltrates into the ceramic body from the ridges from which the internal electrodes are exposed. This may reduce insulation properties between the internal electrodes of the ceramic body.

In view of the circumstances as described above, it is desirable to provide a multi-layer ceramic electronic component having both of moisture resistance and impact resistance and a method of producing the multi-layer ceramic electronic component.

According to an embodiment of the present disclosure, there is provided a multi-layer ceramic electronic component including a ceramic body. The ceramic body includes a multi-layer unit, a side margin, and ridges.

The multi-layer unit includes a capacitance forming unit including ceramic layers laminated in a first direction and internal electrodes disposed between the ceramic layers, a cover that covers the capacitance forming unit in the first direction, and a side surface that faces in a second direction orthogonal to the first direction, the internal electrodes being exposed from the side surface.

The side margin covers the side surface of the multi-layer unit.

The ridges are rounded and extend in a third direction orthogonal to the first direction and the second direction.

The capacitance forming unit includes a first region and a second region, the first region being disposed at a center portion in the first direction, the second region being disposed between the cover and the first region.

In the second region, end portions of the internal electrodes in the second direction are positioned inward in the second direction relative to end portions of the internal electrodes in the second direction in the first region.

In this configuration, the side surface of the multi-layer unit, from which the internal electrodes are exposed, is covered with the side margin, and thus high moisture resistance is obtained. Further, in this ceramic body, the ridges are rounded, and thus chipping, cracking, or the like can be inhibited from occurring in the ridges. Therefore, the multi-layer ceramic electronic component has both moisture resistance and impact resistance.

The multi-layer unit may further include rounded ridges extending in the third direction, each of the rounded ridges including end portions of the cover and the second region in the second direction.

In the second region, the internal electrodes may have dimensions in the second direction that decrease with increasing distance to the cover.

The side margin may have a dimension in the second direction that is equal to or larger than 10 µm at a position adjacent to the second region.

A difference (Dmax−Dmin) between a maximum thickness Dmax of the side margin and a minimum thickness Dmin of the side margin may be equal to or smaller than 10 µm at a position in the second region, the position being adjacent to the internal electrodes in the second direction.

In the first region, the end portions of the internal electrodes in the second direction may have variations in position that fall within a range equal to or smaller than 0.5 µm.

According to another embodiment of the present disclosure, there is provided a method of producing a multi-layer ceramic electronic component, the method including producing a multi-layer chip including a capacitance forming unit including ceramic layers laminated in a first direction and internal electrodes disposed between the ceramic layers, a cover that covers the capacitance forming unit in the first direction, and a side surface that faces in a second direction orthogonal to the first direction, the internal electrodes being exposed from the side surface.

The multi-layer chip is chamfered by barrel polishing, for example.

A side margin is formed on the side surface of the chamfered multi-layer chip.

This configuration allows production of a multi-layer ceramic electronic component having both of moisture resistance and impact resistance as described above.

As described above, according to the present disclosure, it is possible to provide a multi-layer ceramic electronic component having both of moisture resistance and impact resistance and a method of producing the multi-layer ceramic electronic component.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the figures.

In the figures, an X axis, a Y axis, and a Z axis orthogonal to one another are shown as appropriate. The X axis, the Y axis, and the Z axis are common in all figures.

1. General Outline of Multi-Layer Ceramic Capacitor 10

Figure 1:
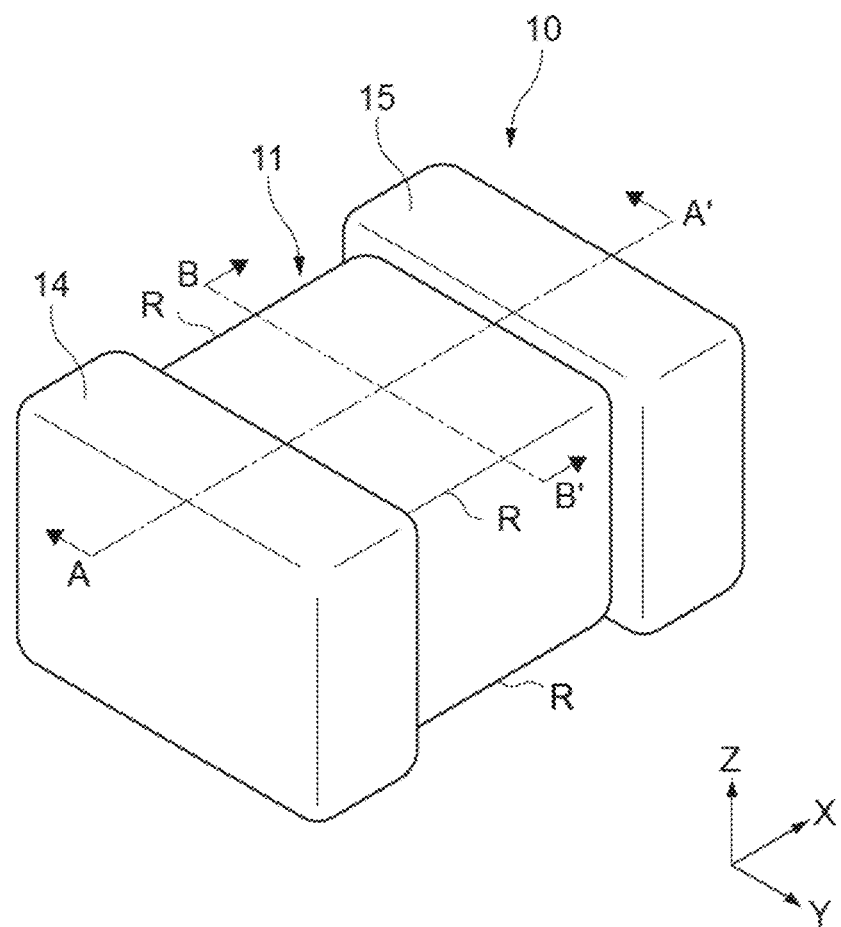
FIG. 1 is a perspective view of a multi-layer ceramic capacitor according to an embodiment of the present disclosure.
Figure 2:
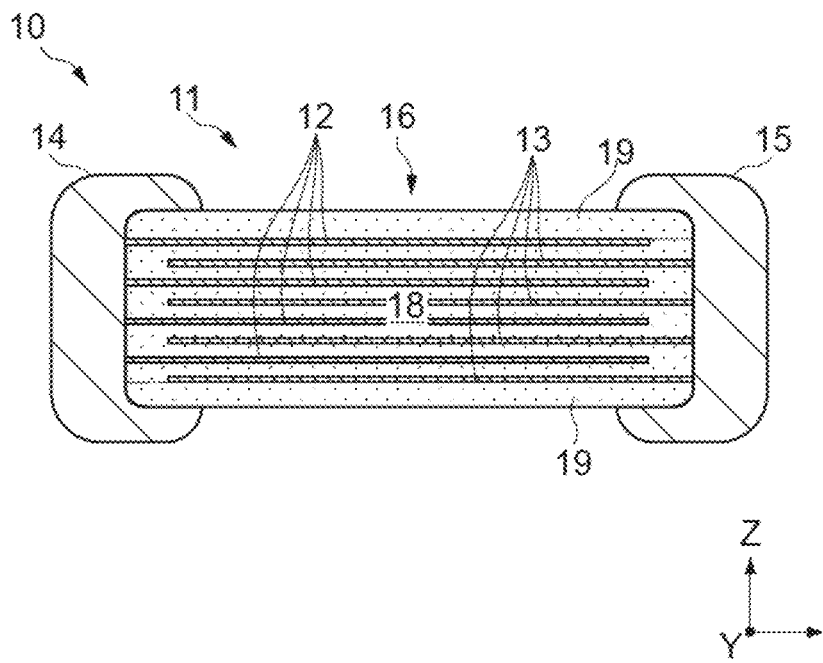
FIG. 2 is a cross-sectional view of the multi-layer ceramic capacitor taken along the A-A' line in FIG. 1.
Figure 3:
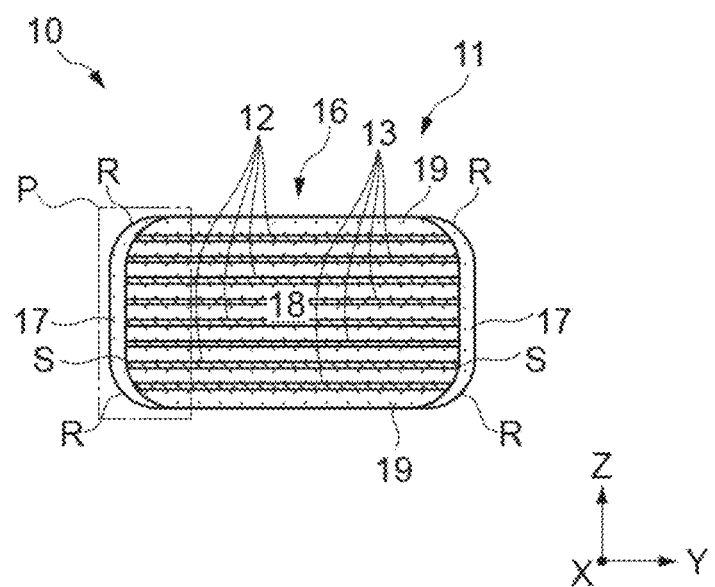
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 is formed as a hexahedron having two main surfaces facing in the Z-axis direction, two side surfaces facing in the Y-axis direction, and two end surfaces facing in the X-axis direction.

Further, the ceramic body 11 has four ridges R connecting the main surfaces and the side surfaces and extending in the X-axis direction. As shown in FIG. 3, the ridges R of the ceramic body 11 are rounded. This can inhibit chipping, cracking, or the like from occurring in the ridges R of the ceramic body 11 due to impact applied at the time of manufacturing, mounting, or the like.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 may not extend to any of the main surfaces and the side surfaces.

The first and second external electrodes 14 and 15 are each formed of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is formed of dielectric ceramics and includes a multi-layer unit 16 and side margins 17. The multi-layer unit 16 has two side surfaces S facing in the Y-axis direction and has a configuration in which a plurality of flat plate-like ceramic layers extending along the X-Y plane are laminated in the Z-axis direction. The side margins 17 are formed on both the side surfaces S of the multi-layer unit 16.

The multi-layer unit 16 includes a capacitance forming unit 18 and covers 19. The capacitance forming unit 18 includes dielectric ceramics, first internal electrodes 12, and second internal electrodes 13 and is covered with the covers 19 vertically in the Z-axis direction. The first and second internal electrodes 12 and 13 each have a sheet-like shape extending along the X-Y plane and are alternately disposed along the Z-axis direction.

In other words, the first internal electrode 12 and the second internal electrode 13 face each other in the Z-axis direction while sandwiching a ceramic layer therebetween. The first internal electrodes 12 are drawn to one of the end surfaces of the ceramic body 11 and connected to the first external electrode 14. The second internal electrodes 13 are drawn to the other end surface of the ceramic body 11 and connected to the second external electrode 15.

With this configuration as described above, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Thus, the multi-layer ceramic capacitor 10 stores charge corresponding to the voltage applied between the first external electrode 14 and the second external electrode 15.

Further, in the capacitance forming unit 18, the surfaces excluding both the end surfaces, which face in the X-axis direction and to which the first external electrode 14 and the second external electrode 15 are provided, are covered with the side margins 17 and the covers 19. Therefore, in the capacitance forming unit 18, the side margins 17 and the covers 19 protect the periphery of the capacitance forming unit 18 and ensure insulation properties of the first internal electrodes 12 and the second internal electrodes 13.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that the multi-layer ceramic capacitor 10 according to this embodiment only needs to include the multi-layer unit 16 and the side margins 17, and other configurations of the multi-layer ceramic capacitor 10 can be changed as appropriate. For example, the number of first and second internal electrodes 12 and 13 can be determined as appropriate according to the size and performance expected for the multi-layer ceramic capacitor 10.

2. Ridges R of Ceramic Body 11

2.1 Schematic Configuration

Figure 4:
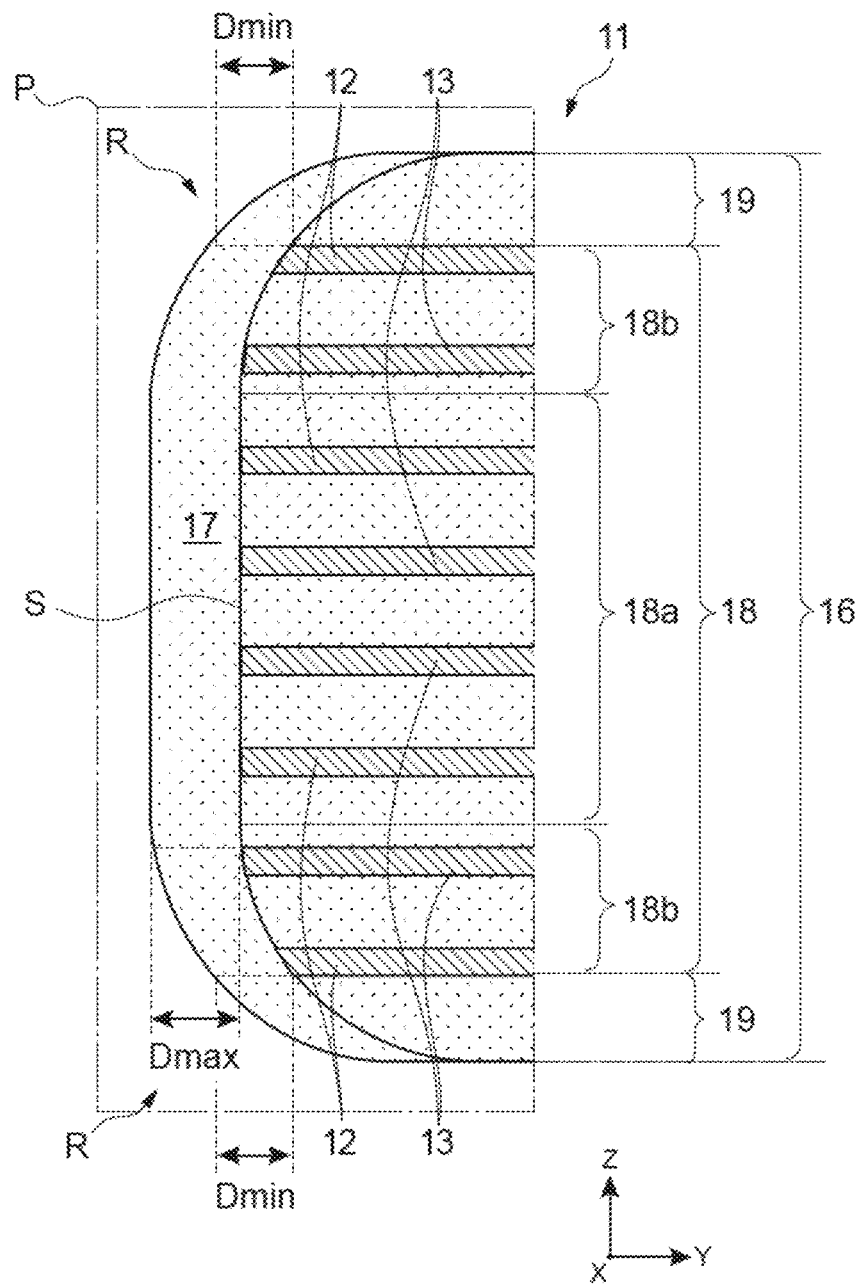
FIG. 4 is a partially enlarged cross-sectional view of an area P of the multi-layer ceramic capacitor shown in FIG. 3.

FIG. 4 is a partially enlarged cross-sectional view of an area P of the multi-layer ceramic capacitor 10, which is surrounded by a chain line of FIG. 3. In other words, FIG. 4 shows one end portion of the ceramic body 11 in the Y-axis direction. It should be noted that the other end portion of the ceramic body 11 in the Y-axis direction on the opposite side, which is not shown in FIG. 4, is also the same as the end portion of the ceramic body 11 in the Y-axis direction shown in FIG. 4, and thus description thereof will be omitted.

The first and second internal electrodes 12 and 13 are exposed to both the side surfaces S of the multi-layer unit 16. The side margins 17 cover the entire side surfaces S of the multi-layer unit 16. Accordingly, in the ceramic body 11, the first and second internal electrodes 12 and 13 are not exposed to the side surfaces of the ceramic body 11. Therefore, in the multi-layer ceramic capacitor 10, moisture is difficult to infiltrate into the capacitance forming unit 18, and high moisture resistance can thus be obtained.

Further, the ridges of the multi-layer unit 16, which extend in the X-axis direction and are covered with the ridges R of the ceramic body 11, are rounded by chamfering. The side margins 17 are curved inward in the Y-axis direction along the side surfaces S of the multi-layer unit 16 in the ridges R of the ceramic body 11. Thus, the rounded ridges R are formed in ceramic body 11.

Accordingly, as will be described later in detail in the section "Method of Producing Multi-layer Ceramic Capacitor 10", the ceramic body 11 can have rounded ridges R without chamfering the ceramic body 11. This can provide high impact resistance to the multi-layer ceramic capacitor 10 without impairing moisture resistance.

2.2 Detailed Configuration

As shown in FIG. 4, the capacitance forming unit 18 of the multi-layer ceramic capacitor 10 can be divided into a first region 18a and second regions 18b. The first region 18a is disposed at the center portion in the Z-axis direction. Each of the second regions 18b is disposed between the first region 18a and the corresponding one of the covers 19 vertically disposed in the Z-axis direction. End portions of the covers 19 and the second regions 18b in the Y-axis direction form the rounded ridges of the multi-layer unit 16.

In the first region 18a of the capacitance forming unit 18, the side surface S extends to be flat along the X-Z plane. Accordingly, the positions of the end portions in the Y-axis direction of the first and second internal electrodes 12 and 13 exposed to the side surface S are aligned with one another along the Z-axis direction. Specifically, in the first region 18a, it is favorable that variations in positions of the end portions of the first and second internal electrodes 12 and 13 in the Y-axis direction fall within a range equal to or smaller than 0.5 μm.

In the second regions 18b of the capacitance forming unit 18, the side surface S is rounded inward in the Y-axis direction from the first region 18a toward the covers 19. Therefore, in the capacitance forming unit 18, the end portions of the first and second internal electrodes 12 and 13, which are exposed to the side surface S, in the second regions 18b are positioned inward in the Y-axis direction relative to those in the first region 18a.

In other words, in each second region 18b of the capacitance forming unit 18, the dimension thereof in the Y-axis direction gradually decreases from the first region 18a toward the cover 19. Therefore, in the capacitance forming unit 18, the dimensions of the first and second internal electrodes 12 and 13 in the Y-axis direction in the second region 18b are smaller than those in the first region 18a.

In the side margin 17 that covers the side surface S of the capacitance forming unit 18, a position adjacent to the second region 18b tends to have a smaller thickness in the Y-axis direction than a position adjacent to the first region 18a. Accordingly, in order to ensure high moisture resistance, it is favorable that the dimension of the side margin 17 in the Y-axis direction is equal to or larger than 10 μm at a position adjacent to the second region 18b.

Further, the thickness of the side margin 17 in the Y-axis direction that covers the side surface S of the capacitance forming unit 18 tends to be small particularly at a position adjacent to the outermost first and second internal electrodes 12 and 13 in the Z-axis direction. Accordingly, it is more favorable that a thickness Dmin of the side margin 17 in the Y-axis direction is equal to or larger than 10 μm at a position adjacent to the outermost first and second internal electrodes 12 and 13 in the Z-axis direction. It should be noted that the thickness Dmin is the smallest thickness of the side margin 17 at the position adjacent to the first and second internal electrodes 12 and 13 in the Y-axis direction in the second region 18b. Further, assuming that the largest thickness of the side margin 17 at the position adjacent to the first and second internal electrodes 12 and 13 in the Y-axis direction in the second region 18b is Dmax, a difference (Dmax-Dmin) between the thickness Dmax and the thickness Dmin is favorably equal to or smaller than 10 μm.

Furthermore, from a similar point of view, it is not favorable that the thickness of the side margin 17 in the Y-axis direction is excessively small with respect to the dimensions of the first and second internal electrodes 12 and 13 in the Y-axis direction at the position adjacent to the side margin 17 in the Y-axis direction. Accordingly, it is favorable that the thickness of the side margin 17 in the Y-axis direction is 6% or more of the dimensions of the first and second internal electrodes 12 and 13 in the Y-axis direction, which are adjacent to the side margin 17 in the Y-axis direction.

In addition, the dimension of the side margin 17 in the Y-axis direction at the position adjacent to the first region 18a is favorably kept equal to or smaller than 30 μm, and more favorably, equal to or smaller than 20 μm. This increases an intersectional area of the first and second internal electrodes 12 and 13 in the capacitance forming unit 18 of the multi-layer ceramic capacitor 10 and allows a large capacitance to be ensured.

3. Method of Producing Multi-Layer Ceramic Capacitor 10

Figure 5:
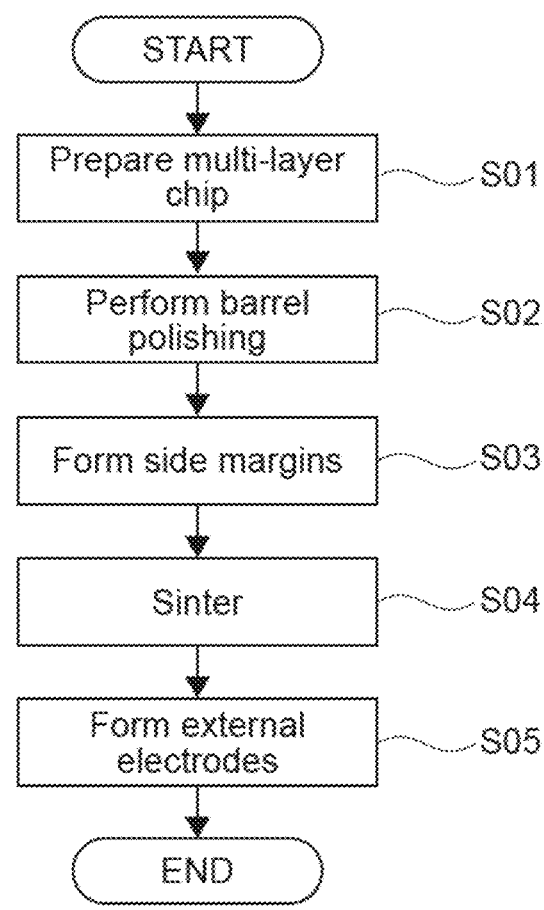
FIG. 5 is a flowchart showing a method of producing the multi-layer ceramic capacitor.

FIG. 5 is a flowchart showing a method of producing the multi-layer ceramic capacitor 10. FIGS. 6 to 11 are views each showing a production process of the multi-layer ceramic capacitor 10. Hereinafter, the method of producing the multi-layer ceramic capacitor 10 will be described according to FIG. 5 with reference to FIGS. 6 to 11 as appropriate.

3.1 Step S01: Preparation of Multi-Layer Chip

Figure 6:
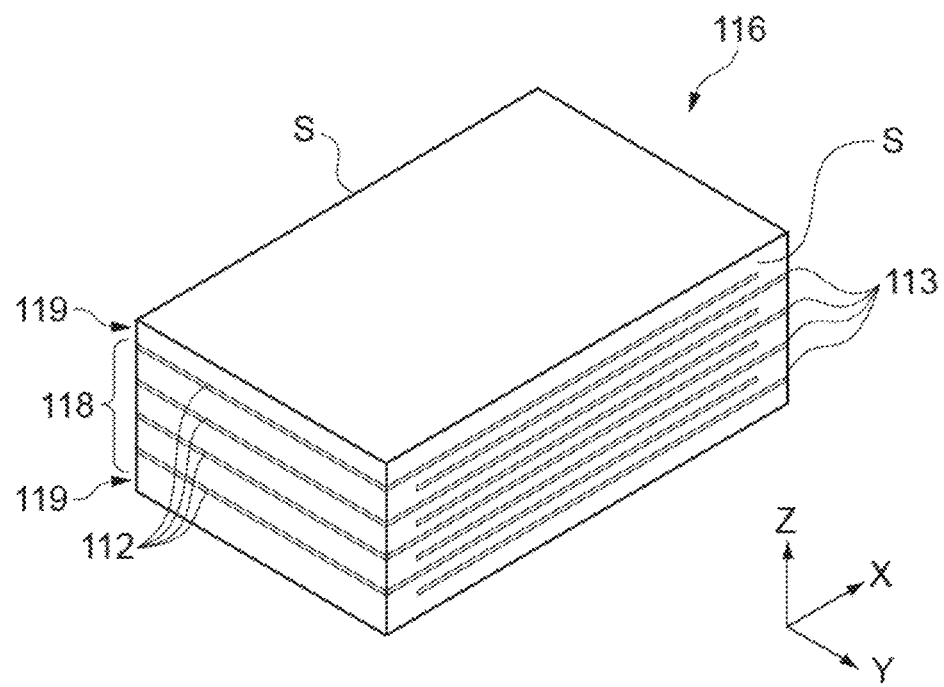
FIG. 6 is a perspective view showing a production process of the multi-layer ceramic capacitor.

In Step S01, a multi-layer chip 116 shown in FIG. 6 is prepared. The multi-layer chip 116 includes a plurality of laminated unsintered dielectric green sheets on which internal electrodes 112 and 113 are patterned as appropriate. With this configuration, an unsintered capacitance forming unit 118 and unsintered covers 119 are formed in the multi-layer chip 116.

3.2 Step S02: Barrel Polishing

In Step S02, the multi-layer chip 116 prepared in Step S01 is chamfered by barrel polishing. The barrel polishing in Step S02 can be executed by, for example, putting the plurality of multi-layer chips 116, a polishing medium, and liquid into a barrel container, sealing it, and imparting rotational motions or vibrations to the barrel container.

Figure 7:
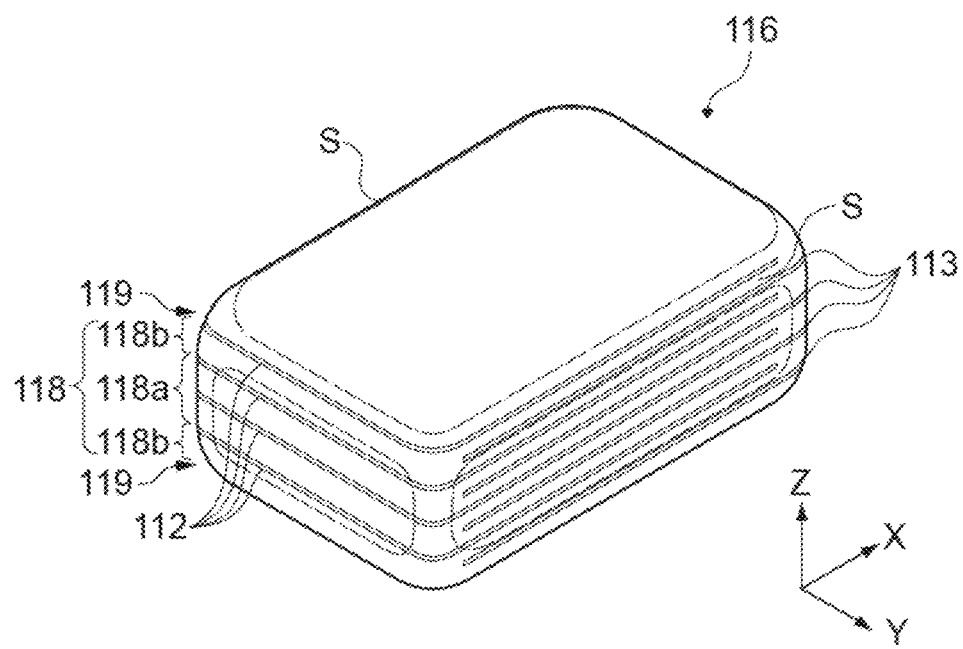
FIG. 7 is a perspective view showing the production process of the multi-layer ceramic capacitor.

In the barrel polishing, the side surfaces S of each multi-layer chip 116 easily become worn in both the end portions in the Z-axis direction more than in the center portion in the Z-axis direction. Accordingly, as shown in FIG. 7, the capacitance forming unit 118 is formed in the multi-layer chip 116, in which the end portions of the internal electrodes 112 and 113 exposed to the side surfaces S in second regions 118b are positioned inward in the Y-axis direction relative to those in a first region 118a.

3.3 Step S03: Formation of Side Margins

In Step S03, unsintered side margins 117 are provided to the side surfaces S of the multi-layer chip 116 chamfered in Step S02, to produce an unsintered body 111. Hereinafter, description will be given on an example of a method of providing the unsintered side margins 117 to the side surfaces S of the multi-layer chip 116.

Figure 8:
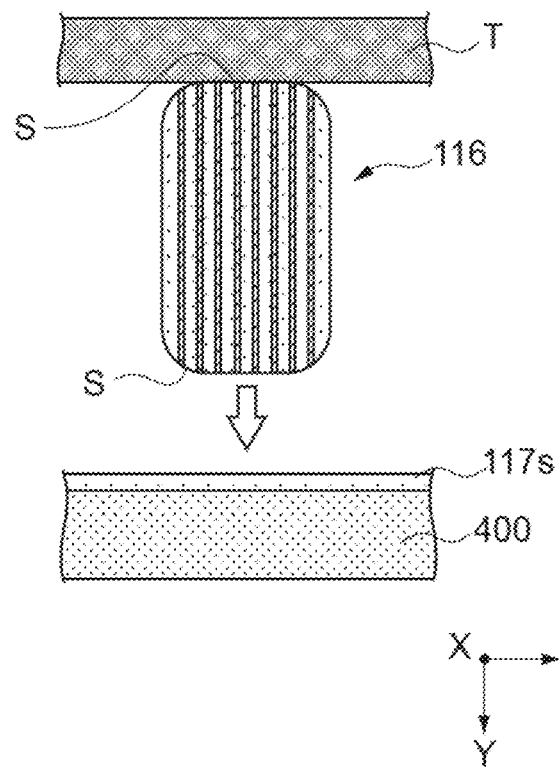
FIG. 8 is a cross-sectional view showing the production process of the multi-layer ceramic capacitor.

First, as shown in FIG. 8, one side surface S of the multi-layer chip 116, the other side surface S of which is held with a tape T, is caused to face a side margin sheet 117s disposed on a flat plate-like elastic body 400. The side margin sheet 117s is formed as a large-sized dielectric green sheet for forming the unsintered side margins 117.

The thickness of the side margin 17 in the Y-axis direction of the multi-layer ceramic capacitor 10 shown in FIGS. 3 and 4 is adjustable by the thickness of the side margin sheet 117s. The side margin sheet 117s is formed into a sheet by using, for example, a roll coater or a doctor blade, and the thickness thereof can thus be accurately controlled.

Figure 9:
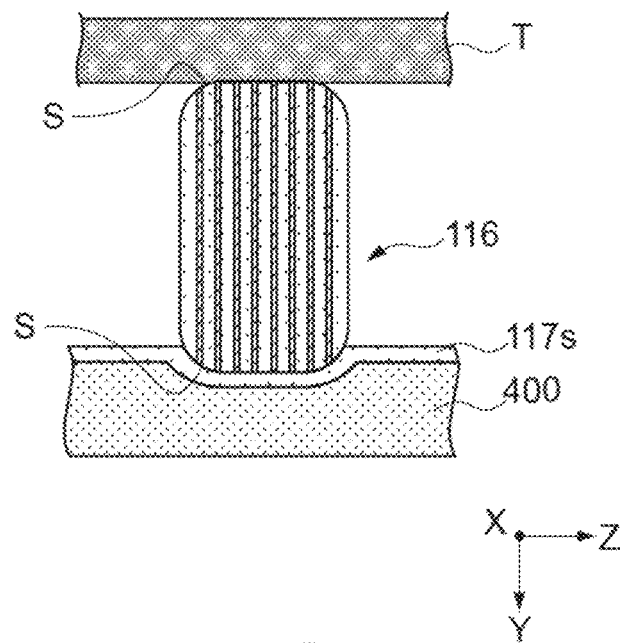
FIG. 9 is a cross-sectional view showing the production process of the multi-layer ceramic capacitor.

Next, as shown in FIG. 9, the side surface S of the multi-layer chip 116 is pressed against the side margin sheet 117s and the multi-layer chip 116 is caused to sink into the elastic body 400 together with the side margin sheet 117s. At that time, only a region of the side margin sheet 117s, which is pressed by the multi-layer chip 116, is cut off by a shear force applied from the elastic body 400.

Figure 10:
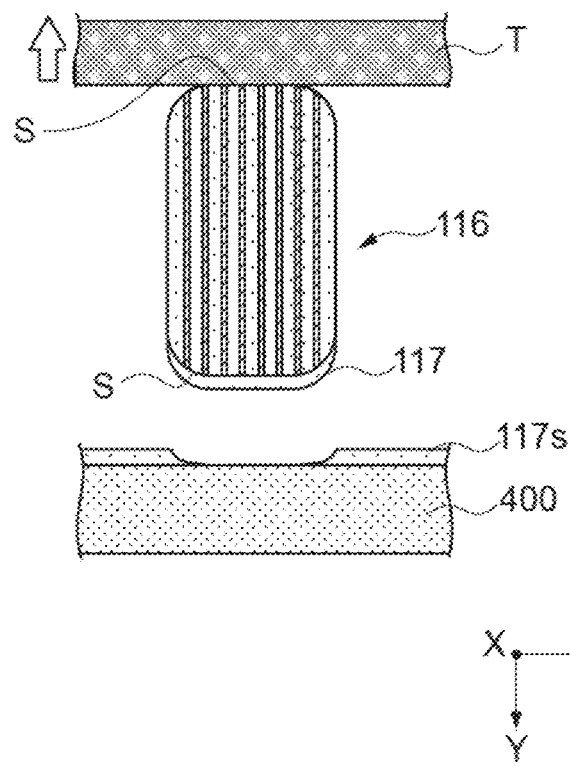
FIG. 10 is a cross-sectional view showing the production process of the multi-layer ceramic capacitor.

When the multi-layer chip 116 is moved so as to separate from the elastic body 400 as shown in FIG. 10, only the part of the side margin sheet 117s, which is attached to the side surface S of the multi-layer chip 116, separates from the elastic body 400. Thus, the side margin 117 is formed on the side surface S of the multi-layer chip 116.

Subsequently, the orientation of the multi-layer chip 116 in the Y-axis direction is inverted by transferring the multi-layer chip 116 shown in FIG. 10 to a different tape. In the manner similar to the above, the side margin 117 is formed also on the side surface S on the other side of the multi-layer chip 116, on which the side margin 117 is not formed.

Figure 11:
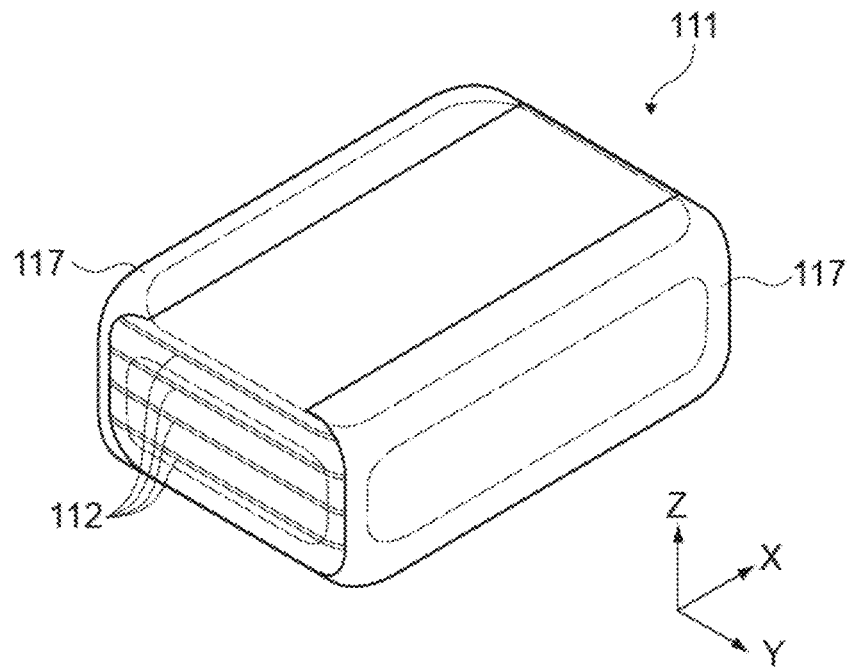
FIG. 11 is a perspective view showing the production process of the multi-layer ceramic capacitor.

With this configuration, as shown in FIG. 11, the unsintered ceramic body 111 in which the side margins 117 are formed on both the side surfaces S of the multi-layer chip 116 is obtained. In the unsintered ceramic body 111, the side surfaces S of the multi-layer chip 116, from which the internal electrodes 112 and 113 are exposed, are covered with the side margins 117.

In such a manner, in this embodiment, the side margins 117 are provided to the side surfaces S, from which the internal electrodes 112 and 113 are exposed, of the multi-layer chip 116 in a subsequent step. Accordingly, in the multi-layer ceramic capacitor 10, in the first region 18a of the capacitance forming unit 18, the positions of the end portions of the first and second internal electrodes 12 and 13 in the Y-axis direction are aligned with one another along the Z-axis direction.

It should be noted that a method of forming the side margins 117 on the side surfaces S of the multi-layer chip 116 is not limited to the above method of punching out the side margin sheet 117s. For example, the side margin sheets 117s previously cut may be attached to the side surfaces S of the multi-layer chip 116 to form the side margins 117.

Alternatively, a method of forming the side margins 117 on the side surfaces S of the multi-layer chip 116 may be a dip method, in which each side surface S of the multi-layer chip 116 is immersed into ceramic slurry and then pulled up. Thus, the ceramic slurry adheres to the side surface S of the multi-layer chip 116, thus forming the side margin 117.

3.4 Step S04: Sintering

In Step S04, the unsintered ceramic body 111 obtained in Step S03 is sintered to produce the ceramic body 11 of the multi-layer ceramic capacitor 10 shown in FIGS. 1 to 3. In other words, in Step S04, the multi-layer chip 116 becomes the multi-layer unit 16, and the side margins 117 become the side margins 17.

A sintering temperature in Step S04 can be determined on the basis of a sintering temperature for the ceramic body 111. For example, when a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

3.5 Step S05: Formation of External Electrodes

In Step S05, the first external electrode 14 and the second external electrode 15 are formed on both the end portions of the ceramic body 11 in the X-axis direction obtained in Step S04, to produce the multi-layer ceramic capacitor 10 shown in FIGS. 1 to 3. A method of forming the first external electrode 14 and the second external electrode 15 in Step S05 is optionally selectable from publicly known methods.

3.6 Actions and Effects of Embodiment

This embodiment is different in the order from publicly known processes in which a ceramic body having side margins is prepared and barrel polishing is then performed thereon. In other words, barrel polishing is performed on a ceramic body having side margins in a publicly known process, whereas barrel polishing is performed on a multi-layer chip 116 without side margins 117 in this embodiment.

In general, in the process of providing the side margins in a subsequent step, the density of the side margins is lower than that of the multi-layer chip. Accordingly, when barrel polishing is performed on the ceramic body having the side margins, the side margins may be selectively worn in the ridges of the ceramic body, and the internal electrodes disposed in the multi-layer chip may be exposed.

To the contrary, in this embodiment, the side margins 117 are formed on the multi-layer chip 116 having been subjected to the barrel polishing, and thus the internal electrodes 112 and 113 exposed from the side surfaces S of the multi-layer chip 116 can be reliably covered. Accordingly, the multi-layer ceramic capacitor 10 according to this embodiment obtains high moisture resistance.

Further, in this embodiment, barrel polishing is performed on the multi-layer chip 116 before the side margins 117 are formed thereon, and thus the ridges of the multi-layer chip 116 are chamfered. Accordingly, the side margins 117 are formed along the side surfaces S of the multi-layer chip 116 and thus curved along the side surfaces S of the multi-layer chip 116.

With this configuration, rounded ridges R are formed on the ceramic body 111. Accordingly, in this embodiment, it is unnecessary to perform further barrel polishing on the ceramic body 111, and abrasion of the side margins 117 does not occur. Therefore, in the multi-layer ceramic capacitor 10, the thickness of the side margin 17 in the Y-axis direction can be ensured.

4. Examples

4.1 Production of Multi-layer Ceramic Capacitor 10

200 samples of the multi-layer ceramic capacitor 10 according to each of Examples 1 to 9 were produced by the production method described above. The samples according to Examples 1 to 9 were different between Examples 1 to 9 in only the thickness Dmin of the side margin 17 in the Y-axis direction shown in FIG. 4 and have in common other configurations and production conditions.

Specifically, the thickness Dmin of the side margin 17 was set to 20 μm, 18 μm, 16 μm, 12 μm, 10 μm, 8 μm, 5 μm, 3 μm, and 1 μm in the samples of Examples 1 to 9, respectively. It should be noted that the thickness of the side margin 17 in the Y-axis direction at a position adjacent to the first region 18a was set to 20 μm in each sample.

4.2 Evaluation of Moisture Resistance of Multi-Layer Ceramic Capacitor 10

Moisture resistance was evaluated for the samples of the multi-layer ceramic capacitors 10 according to Examples 1 to 9. Specifically, in order to evaluate moisture resistance in Examples 1 to 9, a hygroscopicity test was performed, in which the samples are held for 1,000 hours at a temperature of 45° C. and a humidity of 95% under application of a rated voltage of 10 V.

For each of the samples subjected to the hygroscopicity test, an electric resistance value was measured, and samples whose electric resistance value is equal to or larger than 10 MΩ were determined as good, and samples whose electric resistance value is smaller than 10 MΩ were determined as failure. A rate of the samples determined as failure in the 200 samples, i.e., a failure rate, was then calculated for each of Examples 1 to 9.

Figure 12:
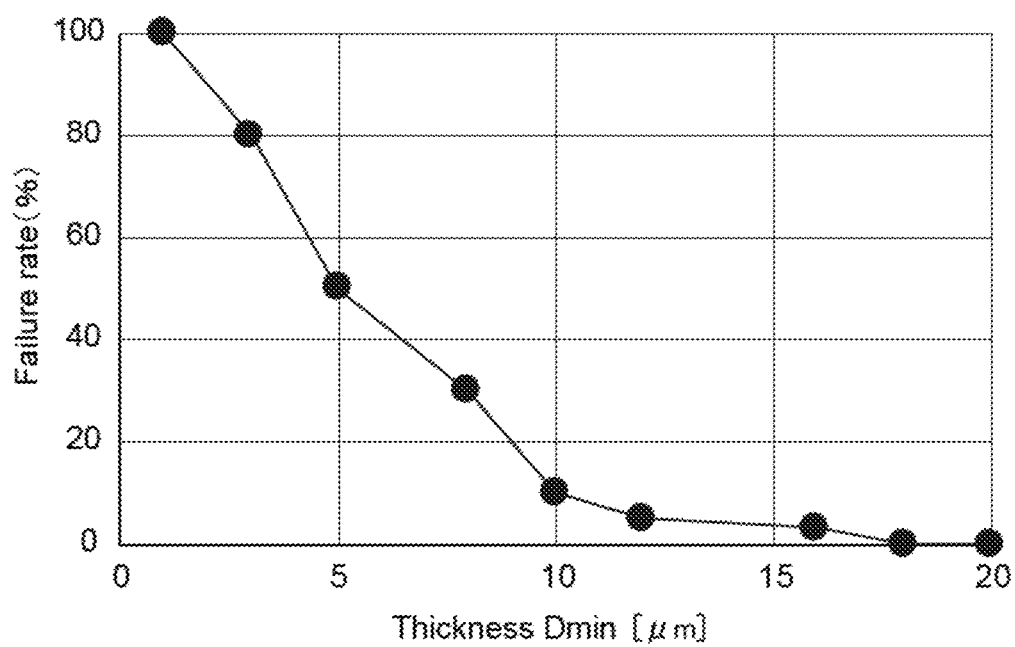
FIG. 12 is a graph showing a relationship between a thickness Dmin of a side margin of the multi-layer ceramic capacitor and a failure rate.

FIG. 12 is a graph showing results of the evaluation of moisture resistance in Examples 1 to 9. In FIG. 12, the horizontal axis represents the thickness Dmin of the side margin 17, and the vertical axis represents the failure rate of the samples after the hygroscopicity test. Further, Table 1 shows results of the evaluation of moisture resistance in Examples 1 to 9 by using numerical values.

TABLE 1

| Sample | Thickness Dmin (μm) | Failure rate (%) |
| --- | --- | --- |
| Example 1 | 20 | 0 |
| Example 2 | 18 | 0 |
| Example 3 | 16 | 3 |
| Example 4 | 12 | 5 |
| Example 5 | 10 | 10 |
| Example 6 | 8 | 30 |
| Example 7 | 5 | 50 |
| Example 8 | 3 | 80 |
| Example 9 | 1 | 100 |

From those results, it is found that the failure rate of the samples becomes lower as the thickness Dmin of the side margin 17 becomes larger. Further, it was confirmed that the failure rate of the samples is suppressed to 10% or lower when the thickness Dmin of the side margin 17 is set to 10 μm or larger, and that the failure of the samples does not substantially occur when the thickness Dmin of the side margin 17 is set to 18 μm or larger. Furthermore, the difference (Dmax-Dmin) between the thickness Dmax and the thickness Dmin is favorably 10 μm or smaller, more favorably 7.5 μm or smaller, and still more favorably 5 μm or smaller. This can suppress variations in failure rate.

5. Other Embodiments

While the embodiment of the present disclosure has been described, the present disclosure is not limited to the embodiment described above, and it should be appreciated that the present disclosure may be variously modified.

For example, the method of producing the multi-layer ceramic capacitor 10 is not limited to the production method described above. As an example, for the method of chamfering the multi-layer chip 116 in Step S02 of the production method described above, publicly known methods are usable other than barrel polishing. For example, sandblasting or wet blasting can also be used for the method of chamfering the multi-layer chip 116.

Further, in the embodiment described above, the multi-layer ceramic capacitor 10 has been described as an example of a multi-layer ceramic electronic component, but the present disclosure can be applied to any other multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising
   a ceramic body including
      a multi-layer unit including
         a capacitance forming unit including
            ceramic layers laminated in a first direction, and
            internal electrodes disposed between the ceramic layers,
         a cover that covers the capacitance forming unit in the first direction, and
         a side surface that faces in a second direction orthogonal to the first direction,
      the internal electrodes being exposed from the side surface,
      a side margin that covers the side surface of the multi-layer unit, and first ridges being rounded and extending in a third direction orthogonal to the first direction and the second direction, the capacitance forming unit including a first region and a second region, the first region being disposed at a center portion in the first direction, the second region being disposed between the cover and the first region, end portions of the internal electrodes in the second direction in the second region being positioned inward in the second direction relative to end portions of the internal electrodes in the second direction in the first region, wherein the internal electrodes have, in the second region, dimensions in the second direction that gradually decrease from the first region toward the cover, wherein the multi-layer unit further includes rounded second ridges extending in the third direction, each of the second ridges including end portions of the cover and the second region in the second direction, each of the second ridges formed at the boundary with the side margin, wherein the first ridges are formed by the side margins and cover the second ridges, and wherein the first ridges and the second ridges are respectively curved from a position inward in the second direction relative to the end portions of the internal electrodes in the second region.

2. The multi-layer ceramic electronic component according to claim 1, wherein
the side margin has a dimension in the second direction that is equal to or larger than 10 μm at a position adjacent to the second region.

3. The multi-layer ceramic electronic component according to claim 1, wherein
a difference (Dmax−Dmin) between a maximum thickness Dmax of the side margin and a minimum thickness Dmin of the side margin is equal to or smaller than 10 μm at a position in the second region, the position being adjacent to the internal electrodes in the second direction.

4. The multi-layer ceramic electronic component according to claim 1, wherein
the end portions of the internal electrodes in the second direction have variations in position that fall within a range equal to or smaller than 0.5 μm in the first region.

5. A method of producing a multi-layer ceramic electronic component, comprising:
producing a multi-layer chip including
a capacitance forming unit including
ceramic layers laminated in a first direction, and
internal electrodes disposed between the ceramic layers,
a cover that covers the capacitance forming unit in the first direction, and
a side surface that faces in a second direction orthogonal to the first direction, the internal electrodes being exposed from the side surface;
chamfering the multi-layer chip; and, after chamfering,
forming a side margin on the side surface of the chamfered multi-layer chip.

6. The method of producing a multi-layer ceramic electronic component according to claim 5, wherein
the multi-layer chip is chamfered by barrel polishing.

* * * * *